(12) United States Patent
Felberbaum et al.

(10) Patent No.: US 11,180,838 B2
(45) Date of Patent: Nov. 23, 2021

(54) HIGH PERFORMANCE ALUMINUM ALLOYS HAVING HIGH AMOUNTS OF RECYCLED MATERIAL AND METHODS OF MAKING THE SAME

(71) Applicant: Novelis Inc., Atlanta, GA (US)

(72) Inventors: Milan Felberbaum, Woodstock, GA (US); Sazol Kumar Das, Acworth, GA (US); Simon William Barker, Woodstock, GA (US); Tudor Piroteala, Acworth, GA (US); Duane E. Bendzinski, Woodstock, GA (US)

(73) Assignee: NOVELIS INC., Atlanta, GA (US)

( * ) Notice: Subject to any disclaimer, the term of this patent is extended or adjusted under 35 U.S.C. 154(b) by 439 days.

(21) Appl. No.: 16/027,788

(22) Filed: Jul. 5, 2018

(65) Prior Publication Data

US 2019/0010592 A1    Jan. 10, 2019

Related U.S. Application Data

(60) Provisional application No. 62/529,026, filed on Jul. 6, 2017.

(51) Int. Cl.
*C22F 1/047* (2006.01)
*C22F 1/043* (2006.01)
(Continued)

(52) U.S. Cl.
CPC ............... *C22F 1/047* (2013.01); *B21B 1/22* (2013.01); *B21B 3/00* (2013.01); *B22D 11/003* (2013.01);
(Continued)

(58) Field of Classification Search
CPC ...................................................... C22F 1/047
(Continued)

(56) References Cited

U.S. PATENT DOCUMENTS 4,260,419 A    4/1981  Robertson
5,213,639 A  * 5/1993  Colvin .................. B32B 15/016
                                                      148/417
(Continued)

FOREIGN PATENT DOCUMENTS

CN          1183813        6/1998
CN        102418013        4/2012
(Continued)

OTHER PUBLICATIONS

International Application No. PCT/US2018/040886 , "International Preliminary Report on Patentability", dated Jan. 16, 2020, 8 pages.
(Continued)

*Primary Examiner* — Coris Fung
*Assistant Examiner* — Danielle Carda
(74) *Attorney, Agent, or Firm* — Kilpatrick Townsend & Stockton LLP

(57) ABSTRACT

Provided herein are high performance aluminum alloy products having desirable mechanical properties and methods of making the same. The high performance aluminum alloy products described herein contain a high content of recycled material and are prepared by casting an aluminum alloy to form a cast aluminum alloy product and processing the cast aluminum alloy product. The method of processing the cast aluminum alloy product can include two hot rolling steps.

13 Claims, 11 Drawing Sheets

(51) Int. Cl.
  *C22F 1/00* (2006.01)
  *B22D 11/00* (2006.01)
  *B21B 1/22* (2006.01)
  *B21B 3/00* (2006.01)
  *B22D 11/049* (2006.01)
  *C22C 21/00* (2006.01)
  *C22F 1/04* (2006.01)

(52) U.S. Cl.
  CPC ............ *B22D 11/049* (2013.01); *C22C 21/00* (2013.01); *C22F 1/002* (2013.01); *C22F 1/04* (2013.01); *C22F 1/043* (2013.01); *B21B 2001/225* (2013.01); *B21B 2003/001* (2013.01)

(58) Field of Classification Search
  USPC .......................................................... 148/551
  See application file for complete search history.

(56) References Cited

U.S. PATENT DOCUMENTS

| 2008/0041501 | A1  | 2/2008  | Platek et al. |          |
|--------------|-----|---------|---------------|----------|
| 2013/0068352 | A1  | 3/2013  | Siles et al.  |          |
| 2014/0366998 | A1* | 12/2014 | Kamat         | B22D 11/003 |
|              |     |         |               | 148/551  |

FOREIGN PATENT DOCUMENTS

| CN | 102851550  | 1/2013 |
| JP | S5544592   | 3/1980 |
| JP | 63125645   | 5/1988 |
| JP | H09111428  | 4/1997 |
| JP | 2001509208 | 7/2001 |
| WO | 9713882    | 4/1997 |

OTHER PUBLICATIONS

Davidkov et al., "Microstructure controlled bending response in AA6016 Al alloys", Materials Science and Engineering: A 528.22-23 (2011): 7068-7076.
PCT/US2018/040886 , "International Search Report and Written Opinion", dated Oct. 1, 2018, 11 pages.
Davis et al., "Aluminum and Aluminum Alloys", Light Metals and Alloys, 2001, pp. 351-416.
Chinese Application No. 201880044879.6, Office Action, dated Dec. 15, 2020, 21 pages.
Japanese Application No. 2020-520444, Office Action, dated Feb. 2, 2021, 15 pages.
Canadian Application No. 3068470, Office Action, dated Apr. 15, 2021, 4 pages.
Indian Application No. 201917054608, First Examination Report, dated Mar. 31, 2021, 7 pages.
Korean Application No. 10-2020-7003136, Office Action, dated May 7, 2021, 8 pages.
Chinese Application No. 201880044879.6, Office Action, dated Jun. 25, 2021, 10 pages.
Xiao, "Research on Process of 5A12-O Aluminum Alloy", Aluminum Fabrication, No. 4, Aug. 20, 2014, 4 pages.
Zhang et al., "Microstructures of 3104 Aluminum Alloy in Hot Rolling Process", Nonferrous Metals, vol. 56, No. 4, Nov. 30, 2004, 5 pages, (English abstract submitted).

* cited by examiner

HIGH PERFORMANCE ALUMINUM ALLOYS HAVING HIGH AMOUNTS OF RECYCLED MATERIAL AND METHODS OF MAKING THE SAME

CROSS-REFERENCE TO RELATED APPLICATION

This application claims the benefit of U.S. Provisional Application No. 62/529,026, filed Jul. 6, 2017, which is incorporated herein by reference in its entirety.

FIELD

The present disclosure relates to metallurgy generally and more specifically to manufacturing aluminum alloys from recycled aluminum scrap.

BACKGROUND

High performance aluminum alloys typically have very low impurity levels. Recycled material can be unsuitable for use in preparing high performance aluminum alloys, as the recycled aluminum alloy scrap contains high amounts of impurities.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Described herein are high performance aluminum alloy products and methods of producing the aluminum alloy products. A method of producing an aluminum alloy product comprises providing a molten aluminum alloy having recycled content in an amount of at least about 30% (e.g., at least about 50% or at least about 70%), casting the molten aluminum alloy to produce a cast aluminum alloy product, hot rolling the cast aluminum alloy product to produce an aluminum alloy hot band (referred to herein as a first hot rolling step), preheating the aluminum alloy hot band, and hot rolling the aluminum alloy hot band to a gauge that is at least about a 50% reduction in thickness as compared to a gauge of the cast aluminum alloy product (referred to herein as a second hot rolling step).

The casting can be performed by continuous casting or by direct chill casting. Optionally, when the casting is performed by direct chill casting, the methods can further include a step of homogenizing the cast aluminum alloy product prior to the step of hot rolling the cast aluminum alloy product.

The providing step can comprise melting an aluminum alloy, aluminum scrap, or a combination of these. Optionally, the molten aluminum alloy comprises iron. The iron can be present in an amount of at least about 0.25 wt. % based on the weight of the molten aluminum alloy (e.g., from about 0.25 wt. % to about 0.50 wt. % based on the weight of the molten aluminum alloy). Optionally, the molten aluminum alloy comprises a 2xxx series aluminum alloy, a 5xxx series aluminum alloy, a 6xxx series aluminum alloy, or a 7xxx series aluminum alloy.

The method described herein can further include quenching the cast aluminum alloy product after the casting step. The quenching can be performed at a rate of about 20° C./s to about 400° C./s. The cast aluminum alloy product can be hot rolled to produce an aluminum alloy hot band having a gauge that is a reduction in thickness of about 30% to about 80% as compared to a gauge of the cast aluminum alloy product.

Aluminum alloy products prepared according to the methods described herein are also provided. The aluminum alloy product can include iron-containing intermetallic particles. The iron-containing intermetallic particles can be spherical in shape. In some cases, at least 50% or at least 80% of the iron-containing intermetallic particles present in the product have an area of 0.75 $\mu m^2$ or less. The aluminum alloy product can be an automobile body part.

DETAILED DESCRIPTION

Figure 1A:
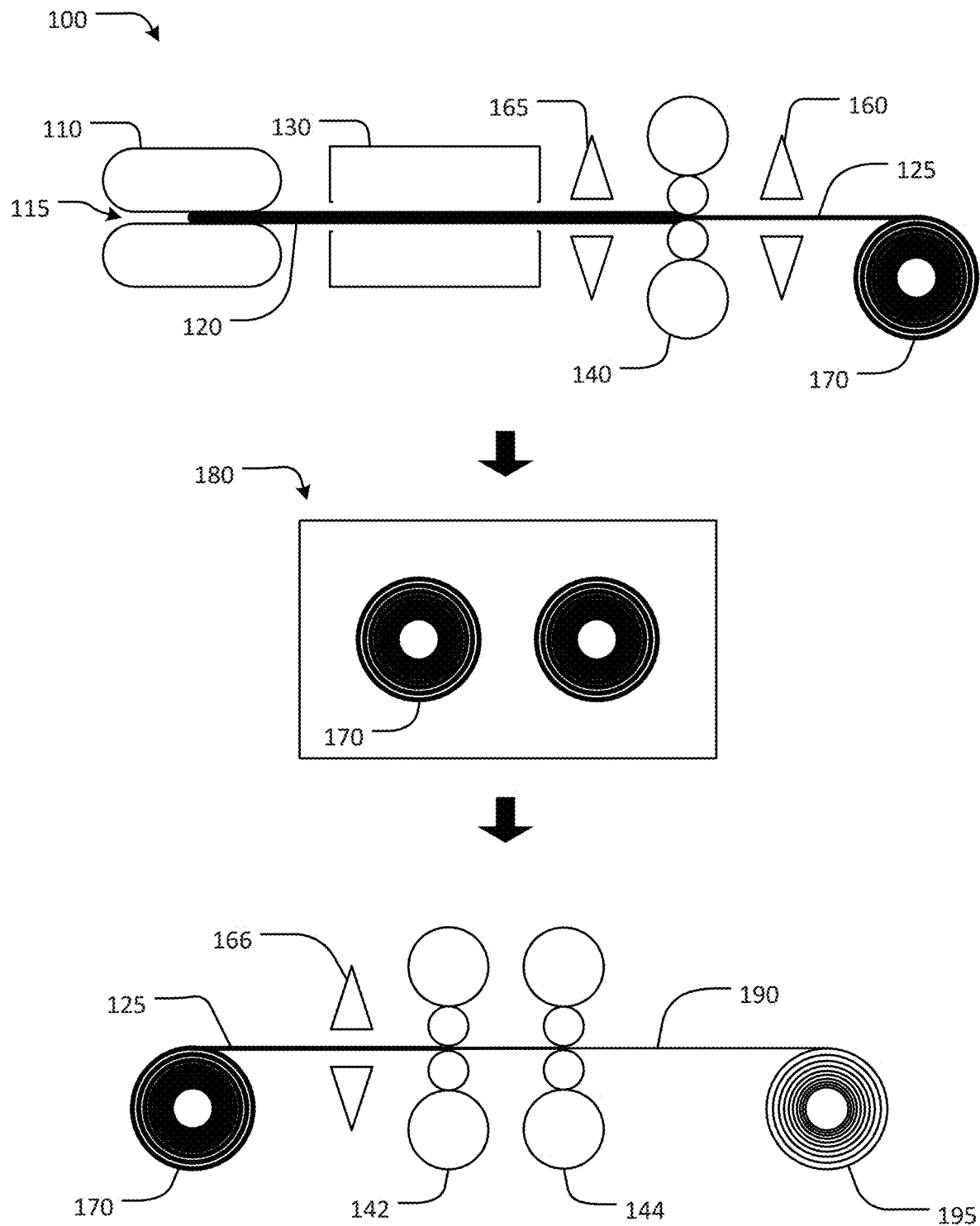
FIG. 1A is a schematic diagram depicting an exemplary aluminum alloy processing method as described herein.

Provided herein are aluminum alloy products having desirable mechanical properties and methods of casting and processing the same. The products are cast in a manner to reduce and/or eliminate negative effects of intermetallic impurity particles in the products and maintain desirable properties, such as desirable mechanical properties. Surprisingly, the aluminum alloy products can be produced from recycled material (e.g., post-consumer scrap) and still exhibit the desirable mechanical properties comparable to those displayed by high performance aluminum alloy products, such as high tensile strength, good formability without cracking and/or fracture, and/or high elongation before fracture.

The aluminum alloy products described herein contain intermetallic particles that have a low aspect ratio (e.g., width to height ratio). As such, the intermetallic particles are circular or spherical in shape. These intermetallic particles enhance the desirable mechanical properties of the products and exhibit superior results as compared to aluminum alloy products having intermetallic particles that are elliptical or needle-like in shape. The aluminum alloy products containing the intermetallic particles are prepared using the methods described herein, which can include two hot rolling steps.

Definitions and Descriptions

As used herein, the terms "invention," "the invention," "this invention," and "the present invention" are intended to refer broadly to all of the subject matter of this patent application and the claims below. Statements containing these terms should be understood not to limit the subject matter described herein or to limit the meaning or scope of the patent claims below.

In this description, reference is made to alloys identified by aluminum industry designations, such as "series" or "6xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "a," "an," or "the" includes singular and plural references unless the context clearly dictates otherwise.

As used herein, terms such as "cast aluminum alloy product," "cast metal product," "cast product," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

As used herein, a plate generally has a thickness of greater than about 15 mm. For example, a plate may refer to an aluminum product having a thickness of greater than about 15 mm, greater than about 20 mm, greater than about 25 mm, greater than about 30 mm, greater than about 35 mm, greater than about 40 mm, greater than about 45 mm, greater than about 50 mm, or greater than about 100 mm.

As used herein, a shate (also referred to as a sheet plate) generally has a thickness of from about 4 mm to about 15 mm. For example, a shate may have a thickness of about 4 mm, about 5 mm, about 6 mm, about 7 mm, about 8 mm, about 9 mm, about 10 mm, about 11 mm, about 12 mm, about 13 mm, about 14 mm, or about 15 mm.

As used herein, a sheet generally refers to an aluminum product having a thickness of less than about 4 mm. For example, a sheet may have a thickness of less than about 4 mm, less than about 3 mm, less than about 2 mm, less than about 1 mm, less than about 0.5 mm, less than about 0.3 mm, or less than about 0.1 mm.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. An Hxx condition or temper, also referred to herein as an H temper, refers to a non-heat treatable aluminum alloy after cold rolling with or without thermal treatment (e.g., annealing). Suitable H tempers include HX1, HX2, HX3 HX4, HX5, HX6, HX7, HX8, or HX9 tempers. A T1 condition or temper refers to an aluminum alloy cooled from hot working and naturally aged (e.g., at room temperature). A T2 condition or temper refers to an aluminum alloy cooled from hot working, cold worked and naturally aged. A T3 condition or temper refers to an aluminum alloy solution heat treated, cold worked, and naturally aged. A T4 condition or temper refers to an aluminum alloy solution heat treated and naturally aged. A T5 condition or temper refers to an aluminum alloy cooled from hot working and artificially aged (at elevated temperatures). A T6 condition or temper refers to an aluminum alloy solution heat treated and artificially aged. A T7 condition or temper refers to an aluminum alloy solution heat treated and artificially overaged. A T8x condition or temper refers to an aluminum alloy solution heat treated, cold worked, and artificially aged. A T9 condition or temper refers to an aluminum alloy solution heat treated, artificially aged, and cold worked. A W condition or temper refers to an aluminum alloy after solution heat treatment.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

The following aluminum alloys are described in terms of their elemental composition in weight percentage (wt. %) based on the total weight of the alloy. In certain examples of each alloy, the remainder is aluminum, with a maximum wt. % of 0.15% for the sum of the impurities.

Methods and Systems for Casting and Processing

High performance aluminum alloy products containing a high content of recycled material are prepared by casting an aluminum alloy to form a cast aluminum alloy product and processing the cast aluminum alloy product. As used herein, an aluminum alloy product containing a "high content" of recycled material refers to an aluminum alloy product containing at least 30% of recycled content. For example, the aluminum alloy product can be prepared from at least 40%, at least 50%, at least 60%, at least 70%, at least 80%, at least 90%, or at least 95% of recycled content. The methods of producing aluminum alloy products as described herein can include the steps of providing a molten aluminum alloy, casting the molten aluminum alloy to form a cast aluminum alloy product, and processing the aluminum alloy product by one or more steps, including, for example, quenching, hot rolling, warm rolling, and/or preheating to form an aluminum alloy product. The methods can include processing the aluminum alloy product using two hot rolling steps.

Providing a Molten Aluminum Alloy

The step of providing a molten aluminum alloy can include melting an aluminum alloy using methods known in the art. The aluminum alloy can be, for example, a 2xxx series aluminum alloy, a 5xxx series aluminum alloy, a 6xxx series aluminum alloy, or a 7xxx series aluminum alloy. The step of providing a molten aluminum alloy can also include melting recycled scrap (e.g., recycled metals and/or alloys).

Exemplary recycled scrap can include materials recycled from any suitable source, such as from a metal production facility (e.g., metal casting facility), from a metalworking facility (e.g., production facility that uses metal product to create consumable products), or from post-consumer sources (e.g., regional recycling facilities or wreckage). Recycled scrap can refer to recycled aluminum and aluminum alloys, such as recycled sheet aluminum-containing products (e.g., aluminum pots and pans), recycled cast aluminum-containing products (e.g., aluminum grills and wheel rims), UBC scrap (e.g., used beverage cans), aluminum wire, and other aluminum-containing materials.

The molten aluminum alloy can include an increased amount of one or more elements due to the presence of the recycled metals and/or alloys. For example, the molten aluminum alloy can optionally contain up to 0.50 wt. % Fe (e.g., 0.1 wt. % to 0.5 wt. % or 0.25 wt. % to 0.5 wt. %), as further described herein. The molten aluminum alloy can then be cast, as further described below.

Continuous Casting and Processing

The aluminum alloy products described herein can be cast using a continuous casting (CC) process. The CC process may include, but is not limited to, the use of twin belt casters, twin roll casters, or block casters. In some examples, the casting process is performed by a CC process to form a cast product such as a billet, slab, shate, strip, or the like. The cast aluminum alloy product can then be subjected to further processing steps. The processing steps can include, for example, solutionizing, quenching, hot rolling, warm rolling, and/or preheating steps.

Solutionizing

The methods described herein can optionally include a step of solutionizing the cast aluminum alloy product. The solutionizing step can include heating or cooling, as necessary, the cast aluminum alloy product to a solutionizing temperature of about 450° C. or greater (e.g., from about 460° C. to about 600° C., from about 465° C. to about 575° C., from about 470° C. to about 550° C., from about 475° C. to about 525° C., or from about 480° C. to about 500° C.). The cast aluminum alloy product can soak at the solutionizing temperature for a period of time. In certain aspects, the cast aluminum alloy product is allowed to soak for at least 30 seconds (e.g., from about 60 seconds to about 120 minutes inclusively). For example, the cast aluminum alloy product can be soaked at the temperature of about 450° C. or greater for 30 seconds, 35 seconds, 40 seconds, 45 seconds, 50 seconds, 55 seconds, 60 seconds, 65 seconds, 70 seconds, 75 seconds, 80 seconds, 85 seconds, 90 seconds, 95 seconds, 100 seconds, 105 seconds, 110 seconds, 115 seconds, 120 seconds, 125 seconds, 130 seconds, 135 seconds, 140 seconds, 145 seconds, 150 seconds, 5 minutes, 10 minutes, 15 minutes, 20 minutes, 25 minutes, 30 minutes, 35 minutes, 40 minutes, 45 minutes, 50 minutes, 55 minutes, 60 minutes, 65 minutes, 70 minutes, 75 minutes, 80 minutes, 85 minutes, 90 minutes, 95 minutes, 100 minutes, 105 minutes, 110 minutes, 115 minutes, 120 minutes, 2.5 hours, 3 hours, 3.5 hours, 4 hours, 4.5 hours, 5 hours, 5.5 hours, 6 hours, or anywhere in between.

Quenching

After the casting step, the cast aluminum alloy product can be quenched. In the quenching step, the cast aluminum alloy product can be cooled to a temperature at or below about 300° C. For example, the cast aluminum alloy product can be cooled to a temperature at or below about 290° C., at or below about 280° C., at or below about 270° C., at or below about 260° C., at or below about 250° C., at or below about 240° C., at or below about 230° C., at or below about 220° C., at or below about 210° C., at or below about 200° C., at or below about 190° C., at or below about 180° C., at or below about 170° C., at or below about 160° C., at or below about 150° C., at or below about 140° C., at or below about 130° C., at or below about 120° C., at or below about 110° C., at or below about 100° C., at or below about 90° C., at or below about 80° C., at or below about 70° C., at or below about 60° C., at or below about 50° C., or at or below about 40° C. (e.g., about 25° C.).

In some non-limiting examples, the quenching step is performed using high cooling rates, which is also referred to herein as rapid cooling. In some cases, the rapid cooling of the cast aluminum alloy product can result in an aluminum alloy product having small intermetallic particles, which can contribute to the desirable mechanical properties described herein. The intermetallic particles refer to alloying element particles contained between aluminum grains, such as iron-containing particles. The cast aluminum alloy product can be cooled at a rate of about 20° C./s to about 400° C./s in the quenching step. The cooling rate can be based on a selected gauge of a cast aluminum alloy product or a selected gauge of a rolled aluminum alloy hot band. For example, the quench rate can be from about 30° C./s to about 390° C./s, from about 40° C./s to about 380° C./s, from about 50° C./s to about 375° C./s, from about 60° C./s to about 370° C./s, from about 70° C./s to about 350° C./s, from about 80° C./s to about 325° C./s, from about 90° C./s to about 300° C./s, from about 100° C./s to about 275° C./s, from about 125° C./s to about 250° C./s, from about 150° C./s to about 225° C./s, or from about 175° C./s to about 200° C./s.

The quenching step can be performed using a liquid (e.g., water), a gas (e.g., air), or another selected quench medium. The cast metal product can be quenched immediately after casting or within a short period of time thereafter (e.g., within about 10 hours or less, about 9 hours or less, about 8 hours or less, about 7 hours or less, about 6 hours or less, about 5 hours or less, about 4 hours or less, about 3 hours or less, about 2 hours or less, about 1 hour or less, or about 30 minutes or less).

Hot Rolling and Forming a Hot Band

The methods also include a step of hot rolling the cast aluminum alloy product. Optionally, the method described herein can include multiple hot rolling steps. When additional hot rolling steps are included, the hot rolling step performed after casting and quenching and before preheating is referred to as the first hot rolling step.

The step of hot rolling the cast aluminum alloy product can include reducing the thickness of the cast aluminum alloy product by at least about 30% and up to about 80% (e.g., by about 30%, by about 35%, by about 40%, by about 45%, by about 50%, by about 55%, by about 60%, by about 65%, by about 70%, by about 75%, or by about 80%). In some examples, hot rolling the cast aluminum alloy product to produce an aluminum alloy hot band can further include reducing the thickness of the cast aluminum alloy product by at least 70%, providing a final gauge aluminum alloy product. The hot rolling the cast aluminum product step can also include dissociating iron-containing intermetallic particles present in the cast aluminum alloy product by spreading out particle agglomerates. In addition, the iron-containing intermetallic particles can form into a spherical shape from the native elongated shape during the hot rolling step. The spherical iron-containing intermetallic particles impact the good crash properties of the resulting aluminum alloy product as compared to elongated iron-containing intermetallic particles.

Hot rolling can be performed at a temperature of from about 400° C. to about 600° C. (e.g., from about 425° C. to about 575° C. or from about 450° C. to about 550° C.). For example, the hot rolling can be performed at a temperature of about 400° C., about 410° C., about 420° C., about 430° C., about 440° C., about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., or anywhere in between). The resulting product can then be coiled and optionally stored in the form of an aluminum alloy hot band. Optionally, the hot band can be stored at room temperature.

Preheating

The aluminum alloy hot band can then be preheated by heating the aluminum alloy hot band to a temperature of from at least about 500° C. to about 600° C. (e.g., from about 510° C. to about 580° C. or from about 530° C. to about 560° C.). In some cases, the aluminum alloy hot band can be preheated to about 500° C., about 510° C., about 520° C., about 530° C., about 540° C., about 550° C., about 560° C., about 570° C., about 580° C., about 590° C., about 600° C., or anywhere in between. Optionally, the aluminum alloy hot band can be maintained at the temperature for a period of up to six hours (e.g., 1 minute or less, 2 minutes or less, 5 minutes or less, 10 minutes or less, 15 minutes or less, 30 minutes or less, one hour or less, two hours or less, three hours or less, four hours or less, five hours or less, or six hours or less).

Additional Hot Rolling Step

The preheated aluminum alloy hot band can then undergo an additional hot rolling step (also referred to herein as a second hot rolling step). Optionally, a quenching can be performed (according to the quenching method described above) before the second hot rolling step. In this step, the preheated aluminum alloy hot band can be further hot rolled to an intermediate or final desired gauge. The hot rolling step can be performed to reduce the thickness of the aluminum alloy hot band by at least about 20% (e.g., by about 30%, by about 35%, by about 40%, by about 45%, or by about 50%). In some cases, the intermediate or final desired gauge resulting from the additional hot rolling step can be at least about a 50% reduction in thickness from the as-cast thickness (i.e., the thickness of the cast aluminum alloy product immediately after casting). For example, the final desired gauge can be about a 50% reduction, a 55% reduction, a 60% reduction, a 65% reduction, a 70% reduction, a 75% reduction, an 80% reduction, an 85% reduction, a 90% reduction, a 95% reduction in thickness, or anywhere in between.

Hot rolling in the second hot rolling step can be performed at a temperature of from about 480° C. to about 600° C. (e.g., from about 500° C. to about 580° C. or from about 520° C. to about 575° C.). For example, hot rolling in the second hot rolling step can be performed at a temperature of about 480° C., about 490° C., about 500° C., about 510° C., about 520° C., about 530° C., about 540° C., about 550° C., about 560° C., about 570° C., about 580° C., about 590° C., or anywhere in between. Hot rolling the preheated aluminum alloy hot band can provide an aluminum alloy product. The aluminum alloy product can then be coiled to provide an aluminum alloy product coil suitable for any of storing, optional further downstream processing, or shipping.

Optional Warm Rolling

In some non-limiting examples, the methods can include an additional warm rolling step. The warm rolling can be performed in lieu of the second hot rolling step (i.e., a hot rolling step can be performed, followed by a preheating step, and then a warm rolling step) or in combination with a second hot rolling step. Optionally, a quenching step can be performed before the warm rolling step. In certain aspects, the preheated aluminum alloy hot band can be cooled to a temperature of from about 350° C. to about 480° C. (e.g., about 350° C., about 360° C., about 370° C., about 380° C., about 390° C., about 400° C., about 410° C., about 420° C., about 430° C., about 440° C., about 450° C., about 460° C., about 470° C., about 480° C., or anywhere in between) at a quench speed that can vary between about 20° C./s to 400° C./s. For example, the quench rate can be from about 30° C./s to about 390° C./s, from about 40° C./s to about 380° C./s, from about 50° C./s to about 375° C./s, from about 60° C./s to about 370° C./s, from about 70° C./s to about 350° C./s, from about 80° C./s to about 325° C./s, from about 90° C./s to about 300° C./s, from about 100° C./s to about 275° C./s, from about 125° C./s to about 250° C./s, from about 150° C./s to about 225° C./s, or from about 175° C./s to about 200° C./s.

The warm rolling step can be performed to reduce the thickness of the aluminum alloy hot band by at least about 20% (e.g., by about 30%, by about 35%, by about 40%, by about 45%, or by about 50%). In some cases, the intermediate or final desired gauge resulting from the warm rolling step can be at least about a 50% reduction in thickness from the as-cast thickness (i.e., the thickness of the cast aluminum alloy product immediately after casting). For example, the final desired gauge can be about a 50% reduction, a 55% reduction, a 60% reduction, a 65% reduction, a 70% reduction, a 75% reduction, an 80% reduction, an 85% reduction, a 90% reduction, a 95% reduction in thickness, or anywhere in between.

Warm rolling can be performed at a temperature of from about 350° C. to about 480° C. For example, warm rolling can be performed at a temperature of about 350° C., about 360° C., about 370° C., about 380° C., about 390° C., about 400° C., about 410° C., about 420° C., about 430° C., about 440° C., about 450° C., about 460° C., about 470° C., about 480° C., or anywhere in between. Warm rolling the aluminum alloy hot band can provide an aluminum alloy product. The aluminum alloy product can then be coiled to provide an aluminum alloy product coil suitable for any of storing, optional further downstream processing, or shipping.

Direct Chill Casting and Processing

In some cases, the aluminum alloy products described herein can be cast using a direct chill (DC) casting process to form a cast product such as an ingot. The cast product can then be subjected to further processing steps. In one non-limiting example, the processing method includes homogenizing the aluminum alloy ingot and hot rolling the aluminum alloy ingot to form an aluminum alloy hot band. The aluminum alloy hot band can then be subjected to the preheating, additional hot rolling, and/or optional warm rolling steps, as described above, to result in the aluminum alloy product having the desired gauge and spherical iron-containing intermetallic particles.

Homogenization

The homogenization step can include heating the ingot to attain a temperature of about, or at least about, 450° C. (e.g., at least 460° C., at least 470° C., at least 480° C., at least 490° C., at least 500° C., at least 510° C., at least 520° C., at least 530° C., at least 540° C., at least 550° C., at least 560° C., at least 570° C., or at least 580° C.). For example, the ingot can be heated to a temperature of from about 450° C. to about 580° C., from about 460° C. to about 575° C., from about 470° C. to about 570° C., from about 480° C. to about 565° C., from about 490° C. to about 555° C., or from about 500° C. to about 550° C. In some cases, the heating rate can be about 100° C./hour or less, 75° C./hour or less, 50° C./hour or less, 40° C./hour or less, 30° C./hour or less, 25° C./hour or less, 20° C./hour or less, or 15° C./hour or less. In other cases, the heating rate can be from about 10° C./min to about 100° C./min (e.g., from about 10° C./min to about 90° C./min, from about 10° C./min to about 70° C./min, from about 10° C./min to about 60° C./min, from about 20° C./min to about 90° C./min, from about 30° C./min to about 80° C./min, from about 40° C./min to about 70° C./min, or from about 50° C./min to about 60° C./min).

The ingot can then be allowed to soak (i.e., held at the indicated temperature) for a period of time. According to one non-limiting example, the ingot is allowed to soak for up to about 36 hours (e.g., from about 30 minutes to about 36 hours, inclusively). For example, the ingot can be soaked at a temperature for 30 minutes, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 25 hours, 26 hours, 27 hours, 28 hours, 29 hours, 30 hours, 31 hours, 32 hours, 33 hours, 34 hours, 35 hours, 36 hours, or anywhere in between.

Hot Rolling

Following the homogenization step, a hot rolling step can be performed. The hot rolling step can be performed at a temperature ranging from about 250° C. to about 550° C. (e.g., from about 300° C. to about 500° C. or from about 350° C. to about 450° C.). The step of hot rolling the cast aluminum alloy product can include reducing the thickness of the cast aluminum alloy product by at least about 30% and up to about 80% (e.g., by about 30%, by about 35%, by about 40%, by about 45%, by about 50%, by about 55%, by about 60%, by about 65%, by about 70%, by about 75%, or by about 80%). In certain cases, the cast aluminum alloy product can be hot rolled to an about 4 mm to about 15 mm thick gauge (e.g., from about 5 mm to about 12 mm thick gauge), which is referred to as a shate. For example, the cast aluminum alloy product can be hot rolled to an about 4 mm thick gauge, about 5 mm thick gauge, about 6 mm thick gauge, about 7 mm thick gauge, about 8 mm thick gauge, about 9 mm thick gauge, about 10 mm thick gauge, about 11 mm thick gauge, about 12 mm thick gauge, about 13 mm thick gauge, about 14 mm thick gauge, or about 15 mm thick gauge. In certain cases, the cast aluminum alloy product can be hot rolled to a gauge greater than 15 mm thick (i.e., a plate). In other cases, the cast aluminum alloy product can be hot rolled to a gauge less than 4 mm (i.e., a sheet).

The resulting product can then be coiled and optionally stored in the form of an aluminum alloy hot band. Optionally, the hot band can be stored at room temperature.

Preheating

The aluminum alloy hot band can then be preheated by heating the aluminum alloy hot band to a temperature of from about 500° C. to about 600° C. (e.g., from about 510° C. to about 580° C. or from about 530° C. to about 560° C.). In some cases, the aluminum alloy hot band can be preheated to about 500° C., about 510° C., about 520° C., about 530° C., about 540° C., about 550° C., about 560° C., about 570° C., about 580° C., about 590° C., about 600° C., or anywhere in between. Optionally, the aluminum alloy hot band can be maintained at the temperature for a period of up to six hours (e.g., 1 minute or less, 2 minutes or less, 5 minutes or less, 10 minutes or less, 15 minutes or less, 30 minutes or less, one hour or less, two hours or less, three hours or less, four hours or less, or five hours or less).

Additional Hot Rolling Step

The preheated aluminum alloy hot band can then undergo an additional hot rolling step (also referred to herein as a second hot rolling step). Optionally, a quenching can be performed (according to the method described above) before the hot rolling step. In this step, the preheated aluminum alloy hot band can be further hot rolled to an intermediate or final desired gauge. The hot rolling step can be performed to reduce the thickness of the aluminum alloy hot band by at least about 20% (e.g., by about 30%, by about 35%, by about 40%, by about 45%, or by about 50%). In some cases, the intermediate or final desired gauge resulting from the additional hot rolling step can be at least about a 50% reduction in thickness from the as-cast thickness (i.e., the thickness of the cast aluminum alloy product immediately after casting). For example, the final desired gauge can be about a 50% reduction, a 55% reduction, a 60% reduction, a 65% reduction, a 70% reduction, a 75% reduction, an 80% reduction, an 85% reduction, a 90% reduction, a 95% reduction in thickness, or anywhere in between.

Hot rolling can be performed at a temperature of from about 480° C. to about 600° C. (e.g., from about 500° C. to about 580° C. or from about 520° C. to about 575° C.). For example, hot rolling can be performed at a temperature of about 480° C., about 490° C., about 500° C., about 510° C., about 520° C., about 530° C., about 540° C., about 550° C., about 560° C., about 570° C., about 580° C., about 590° C., or anywhere in between. Hot rolling the preheated aluminum alloy hot band can provide an aluminum alloy product. The aluminum alloy product can then be coiled to provide an aluminum alloy product coil suitable for any of storing, optional further downstream processing, or shipping.

Aluminum Alloy Products

Described herein are metal products, including aluminum alloy products, having desired mechanical properties. Among other properties, the aluminum alloy products described herein display excellent elongation and forming properties due to the shape of the intermetallic particles in the aluminum alloy products. Specifically, the aluminum alloy products include spherical intermetallic particles, such as iron-containing intermetallic particles. The intermetallic particles in the aluminum alloy products described herein have a low aspect ratio (e.g., width to height ratio), which results in a superior final aluminum alloy product that exhibits the desired forming properties.

The aluminum alloy products can have any suitable composition. In non-limiting examples, the aluminum alloy products can include a 2xxx series aluminum alloy, a 5xxx series aluminum alloy, a 6xxx series aluminum alloy, or a 7xxx series aluminum alloy.

Non-limiting exemplary AA2xxx series alloys for use in the aluminum alloy products can include AA2001, A2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, and AA2199.

Non-limiting exemplary AA5xxx series alloys for use in the aluminum alloy products can include AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, and AA5088.

Non-limiting exemplary AA6xxx series alloys for use in the aluminum alloy products can include AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, and AA6092.

Non-limiting exemplary AA7xxx series alloys for use in the aluminum alloy products can include AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7033, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7034, AA7036, AA7136, AA7037, AA7040, AA7140, AA7041, AA7049, AA7049A, AA7149, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, and AA7099.

In some non-limiting examples, the alloys include iron (Fe) in an amount from about 0.01% to about 0.50% (e.g., from about 0.1% to about 0.25% or from about 0.26% to about 0.50%) based on the total weight of the alloy. For example, the alloys can include 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.25%, 0.26%0.27%0.28%0.29%, 0.3%, 0.31%, 0.32%, 0.33%, 0.34%, 0.35%, 0.36%, 0.37%, 0.38%, 0.39%, 0.4%, 0.41%, 0.42%, 0.43%, 0.44%, 0.45%, 0.46%, 0.47%, 0.48%, 0.49%, or 0.5% Fe. All expressed in wt. %.

The alloys for use in the methods described herein can further include one or more of Cu, Mg, Zn, Si, Zr, Mn, Cr, Ti, rare earth elements (i.e., one or more of Sc, Y, La, Ce, Pr, Nd, Pm, Sm, Eu, Gd, Tb, Dy, Ho, Er, Tm, Yb, and Lu), Mo, Nb, Be, B, Co, Sn, Sr, V, In, Hf, Ag, and Ni and other elements. For example, the alloys for use in the methods described herein can include Mo, Nb, Be, B, Co, Sn, Sr, V, In, Hf, Ag, and Ni in amounts of up to 0.20% (e.g., from 0.01% to 0.20% or from 0.05% to 0.15%) based on the total weight of the alloy. Optionally, Ga, Ca, Bi, Na, and/or Pb may be present as impurities (i.e., in amounts of 0.05% or below, 0.04% or below, 0.03% or below, 0.02% or below, or 0.01% or below).

In addition, the aluminum alloy products described herein can contain at least 30% of recycled content. For example, the aluminum alloy products can contain at least 40%, at least 50%, at least 60%, at least 70%, at least 80%, at least 90%, or at least 95% of recycled content.

The aluminum alloy products described herein include iron-containing intermetallic particles. A substantial amount of the particles present in the aluminum alloy products have a particle size, measured by area, of 0.75 µm$^2$ or less. For example, the particle size, as measured by area, can be 0.70 µm$^2$ or less, 0.65 µm$^2$ or less, 0.60 µm$^2$ or less, 0.55 µm$^2$ or less, 0.50 µm$^2$ or less, 0.45 µm$^2$ or less, or 0.40 µm$^2$ or less. In some examples, the particle size ranges from 0.40 µm$^2$ to 0.75 µm$^2$ (e.g., from 0.45 µm$^2$ to 0.70 µm$^2$ or from 0.50 µm$^2$ to 0.60 µm$^2$). As used herein, a "substantial amount" as related to the number of particles represents at least 50% of the particles present in the aluminum alloy product. For example, at least 60%, at least 65%, at least 70%, at least 75%, at least 80%, at least 85%, at least 90%, at least 95%, or at least 99% of the particles present in the aluminum alloy products have a particle size of 0.75 µm$^2$ or less.

Methods of Using

The aluminum alloy products and methods described herein can be used in, among others, automotive, electronics, and transportation applications, such as commercial vehicle, aircraft, or railway applications. For example, the aluminum alloy products can be used for chassis, cross-member, and intra-chassis components (encompassing, but not limited to, all components between the two C channels in a commercial vehicle chassis) to gain strength, serving as a full or partial replacement of high-strength steels. In certain examples, the aluminum alloy products can be used in the F, T4, T6, or T8x tempers, or in any other suitable temper.

In certain aspects, the aluminum alloy products and methods can be used to prepare motor vehicle body part products. For example, the disclosed aluminum alloy products and methods can be used to prepare automobile body parts, such as bumpers, side beams, roof beams, cross beams, pillar reinforcements (e.g., A-pillars, B-pillars, and C-pillars), inner panels, side panels, floor panels, tunnels, structure panels, reinforcement panels, inner hoods, or trunk lid panels. The disclosed aluminum alloy products and methods can also be used in aircraft or railway vehicle applications, to prepare, for example, external and internal panels.

The aluminum alloy products and methods described herein can also be used in electronics applications, to prepare, for example, external and internal encasements. For example, the aluminum alloy products and methods described herein can also be used to prepare housings for electronic devices, including mobile phones and tablet computers. In some examples, the aluminum alloy products can be used to prepare housings for the outer casing of mobile phones (e.g., smart phones) and tablet bottom chassis.

In certain aspects, the aluminum alloy products and methods can be used to prepare aerospace vehicle body part products. For example, the disclosed aluminum alloy products and methods can be used to prepare airplane body parts, such as skin alloys. The aluminum alloy products and methods can be used in any other desired application.

ILLUSTRATIONS

Illustration 1 is a method of producing an aluminum alloy product, comprising: providing a molten aluminum alloy comprising recycled content in an amount of at least 30%; casting the molten aluminum alloy to produce a cast aluminum alloy product; hot rolling the cast aluminum alloy product in a first hot rolling step to produce an aluminum alloy hot band; preheating the aluminum alloy hot band; and hot rolling the aluminum alloy hot band in a second hot rolling step to a gauge that is at least about a 50% reduction in thickness as compared to a gauge of the cast aluminum alloy product.

Illustration 2 is the method of any preceding or subsequent illustration, wherein the recycled content in the molten aluminum alloy is at least about 50%.

Illustration 3 is the method of any preceding or subsequent illustration, wherein the recycled content in the molten aluminum alloy is at least about 70%.

Illustration 4 is the method of any preceding or subsequent illustration, wherein the casting step comprises continuous casting.

Illustration 5 is the method of any preceding or subsequent illustration, wherein the casting step comprises direct chill casting.

Illustration 6 is the method of any preceding or subsequent illustration, further comprising homogenizing the cast aluminum alloy product prior to the first hot rolling step.

Illustration 7 is the method of any preceding or subsequent illustration, wherein the providing step comprises melting an aluminum alloy, aluminum scrap, or a combination of these.

Illustration 8 is the method of any preceding or subsequent illustration, wherein the molten aluminum alloy comprises iron.

Illustration 9 is the method of any preceding or subsequent illustration, wherein the iron is present in an amount of at least 0.25 wt. % based on the weight of the molten aluminum alloy.

Illustration 10 is the method of any preceding or subsequent illustration, wherein the iron is present in an amount from about 0.25 wt. % to about 0.50 wt. % based on the weight of the molten aluminum alloy.

Illustration 11 is the method of any preceding or subsequent illustration, wherein the molten aluminum alloy comprises a 2xxx series aluminum alloy, a 5xxx series aluminum alloy, a 6xxx series aluminum alloy, or a 7xxx series aluminum alloy.

Illustration 12 is the method of any preceding or subsequent illustration, further comprising quenching the cast aluminum alloy product after the casting step.

Illustration 13 is the method of any preceding or subsequent illustration, wherein the quenching is performed at a rate of about 20° C./s to about 400° C./s.

Illustration 14 is the method of any preceding or subsequent illustration, wherein the cast aluminum alloy product is hot rolled to produce an aluminum alloy hot band having a gauge that is a reduction in thickness of about 30% to about 80% as compared to a gauge of the cast aluminum alloy product.

Illustration 15 is an aluminum alloy product prepared according to the methods of any preceding or subsequent illustration.

Illustration 16 is the aluminum alloy product of any preceding or subsequent illustration, wherein the aluminum alloy product comprises iron-containing intermetallic particles.

Illustration 17 is the aluminum alloy product of any preceding or subsequent illustration, wherein the iron-containing intermetallic particles are spherical.

Illustration 18 is the aluminum alloy product of any preceding or subsequent illustration, wherein at least 50% of the iron-containing intermetallic particles present in the product have an area of 0.75 µm2 or less.

Illustration 19 is the aluminum alloy product of any preceding or subsequent illustration, wherein at least 80% of the iron-containing intermetallic particles present in the product have an area of 0.75 µm2 or less.

Illustration 20 is the aluminum alloy product of any preceding illustration, wherein the aluminum alloy product comprises an automobile body part.

The following examples will serve to further illustrate the present invention without, however, constituting any limitation thereof. On the contrary, it is to be clearly understood that resort may be had to various embodiments, modifications, and equivalents thereof which, after reading the description herein, may suggest themselves to those skilled in the art without departing from the spirit of the invention.

EXAMPLES

Example 1: Continuous Casting and Processing

FIG. 1A is a schematic diagram depicting a continuous casting system 100 according to certain aspects and features of the present disclosure. In some non-limiting examples, a pair of moving opposed casting surfaces 110 define a casting cavity 115 between the pair of moving opposed casting surfaces 110. The pair of moving opposed casting surfaces 110 can be a twin roll caster or a twin belt caster, or any other suitable continuous casting device. A molten metal injector (not shown) positioned adjacent to the pair of moving opposed casting surfaces 110 can inject molten aluminum alloy into the casting cavity 115 between the pair of moving opposed casting surfaces 110. The pair of moving opposed casting surfaces 110 can cast the molten aluminum alloy into a metal (e.g., aluminum alloy) product 120.

Casting the molten aluminum alloy into a metal product 120 can include rapidly extracting heat from the molten aluminum alloy as the molten aluminum alloy product moves through the casting cavity 115 and the metal product 120 exits the casting cavity 115. A solutionizing furnace 130 positioned downstream of the pair of moving opposed casting surfaces 110 can be employed to solutionize the aluminum alloy product 120. Optionally, the solutionizing furnace 130 can be employed to maintain the cast exit temperature of the aluminum alloy product 120. In some cases, the solutionizing furnace 130 can operate at a temperature above a casting exit temperature of the aluminum alloy product 120, in which case optional heating elements positioned upstream of the solutionizing furnace 130 can increase the temperature of the aluminum alloy product 120 before it enters the solutionizing furnace 130. A rolling mill 140 positioned downstream of the solutionizing furnace 130 can be used to reduce the thickness of the aluminum alloy product 120, resulting in an aluminum alloy hot band 125 (e.g., to roll the aluminum alloy product 120 into an aluminum alloy hot band 125). The thickness of the aluminum alloy product 120 can be reduced by about 50% to provide the aluminum alloy hot band 125. A quenching device 160 positioned downstream of the rolling mill 140 can be used to quench (e.g., rapidly cool) the aluminum alloy hot band. The aluminum alloy hot band 125 can then be coiled to provide an aluminum alloy hot band coil 170 suitable for storing before further downstream processing. Optionally, a second quenching device 165 can be positioned upstream of the rolling mill 140 to quench the aluminum alloy product 120 prior to rolling. In some cases, such a second quenching device 165 can be suitable for use with a warm rolling procedure (e.g., rolling at temperatures below the recrystallization temperature). In some cases, the use of a second quenching device 165 immediately before rolling can result in aluminum alloy hot band having a T3 or T8x temper, depending on whether the aluminum alloy product is artificially aged thereafter.

As mentioned above, further downstream processing (e.g., additional hot rolling, cold rolling, or artificial aging) can be employed. The aluminum alloy hot band coil 170 can be preheated in a preheating furnace 180 before, for example, additional hot rolling. After preheating, the hot band 125 can be hot rolled. The aluminum alloy hot band 125 can optionally be quenched by a quenching device 166 positioned upstream of a second rolling mill 142 to quench the aluminum alloy hot band 125 prior to rolling. In some cases, the quenching device 166 can be suitable for use with a warm rolling procedure (e.g., rolling at temperatures below the recrystallization temperature). Hot rolling can employ a single hot rolling mill 142 or a plurality of hot rolling mills 142, 144, depending on desired final gauge. The hot band 125 can be rolled to a final gauge aluminum alloy product 190. The thickness of the aluminum alloy hot band 125 can be further reduced by about 20% to provide a final gauge aluminum alloy product 190. The final gauge aluminum alloy product 190 can have a thickness that is at least about 50% (e.g., 70%) of the as-cast aluminum alloy product 120 (total reduction of the aluminum alloy product 120 is at least about 50%). The final gauge aluminum alloy product 190 can then be coiled to provide an aluminum alloy product coil 195 suitable for any of storing, further downstream processing, or shipping. The processing methods described in the example of FIG. 1A are referred to herein as "Route 1."

Figure 1B:
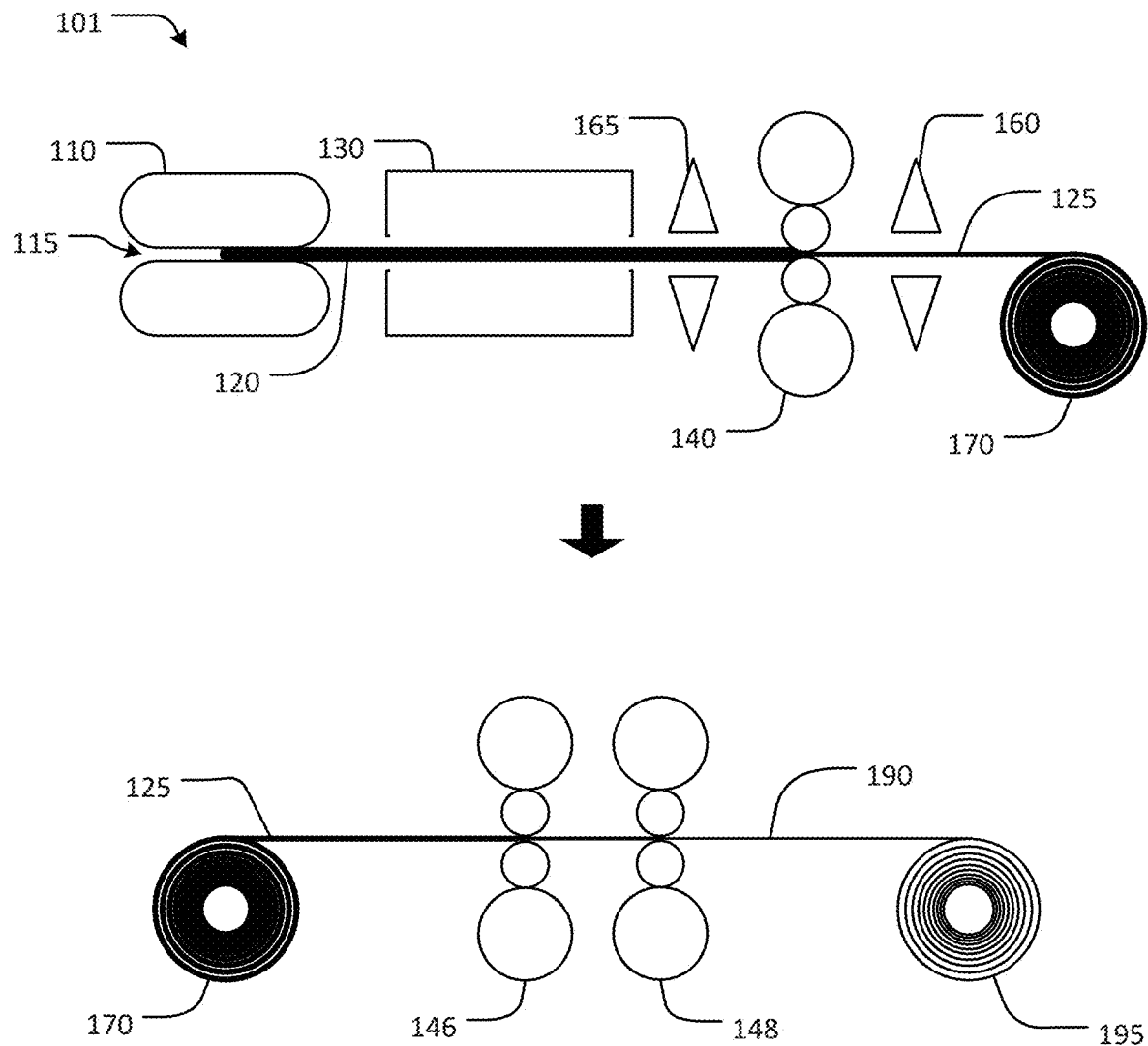
FIG. 1B is a schematic diagram depicting an exemplary aluminum alloy processing method as described herein.

FIG. 1B is a schematic diagram depicting a continuous casting system 101 according to certain aspects and features of the present disclosure. The processing methods described in the example of FIG. 1B are hereinafter referred to as "Route 2." Certain aspects of Route 2 are performed similarly to Route 1, including casting, solutionizing, quenching, hot rolling, and quenching to provide the aluminum alloy hot band 125 that can then be coiled to provide an aluminum alloy hot band coil 170 suitable for storing before further downstream processing. As shown in FIG. 1B, the aluminum alloy hot band coil 170 can be uncoiled and the aluminum alloy hot band 125 can be cold rolled. Cold rolling can employ a single cold rolling mill 146 or a plurality of cold rolling mills 146, 148, depending on desired final gauge. In the cold rolling step, the hot band 125 can be cold rolled to the final gauge aluminum alloy product 190. The final gauge aluminum alloy product 190 can then be coiled to provide the aluminum alloy product coil 195 suitable for any of storing, further downstream processing, or shipping.

Example 2: Properties of the Aluminum Alloy Product

Aluminum alloy products were prepared having the compositions as shown in Table 1:

TABLE 1

| Alloy | Si | Fe | Cu | Mn | Cr | Mg | Ti | B |
|---|---|---|---|---|---|---|---|---|
| Alloy 1 | 0.803 | 0.223 | 0.099 | 0.080 | 0.040 | 0.656 | 0.036 | 0.0027 |
| Alloy 2 | 0.600 | 0.220 | 0.550 | 0.200 | 0.020 | 0.700 | — | — |

All values are weight percent (wt. %) of the whole, the alloys can contain up to 0.15 wt. % total impurities and the remainder is aluminum.

Figure 2:
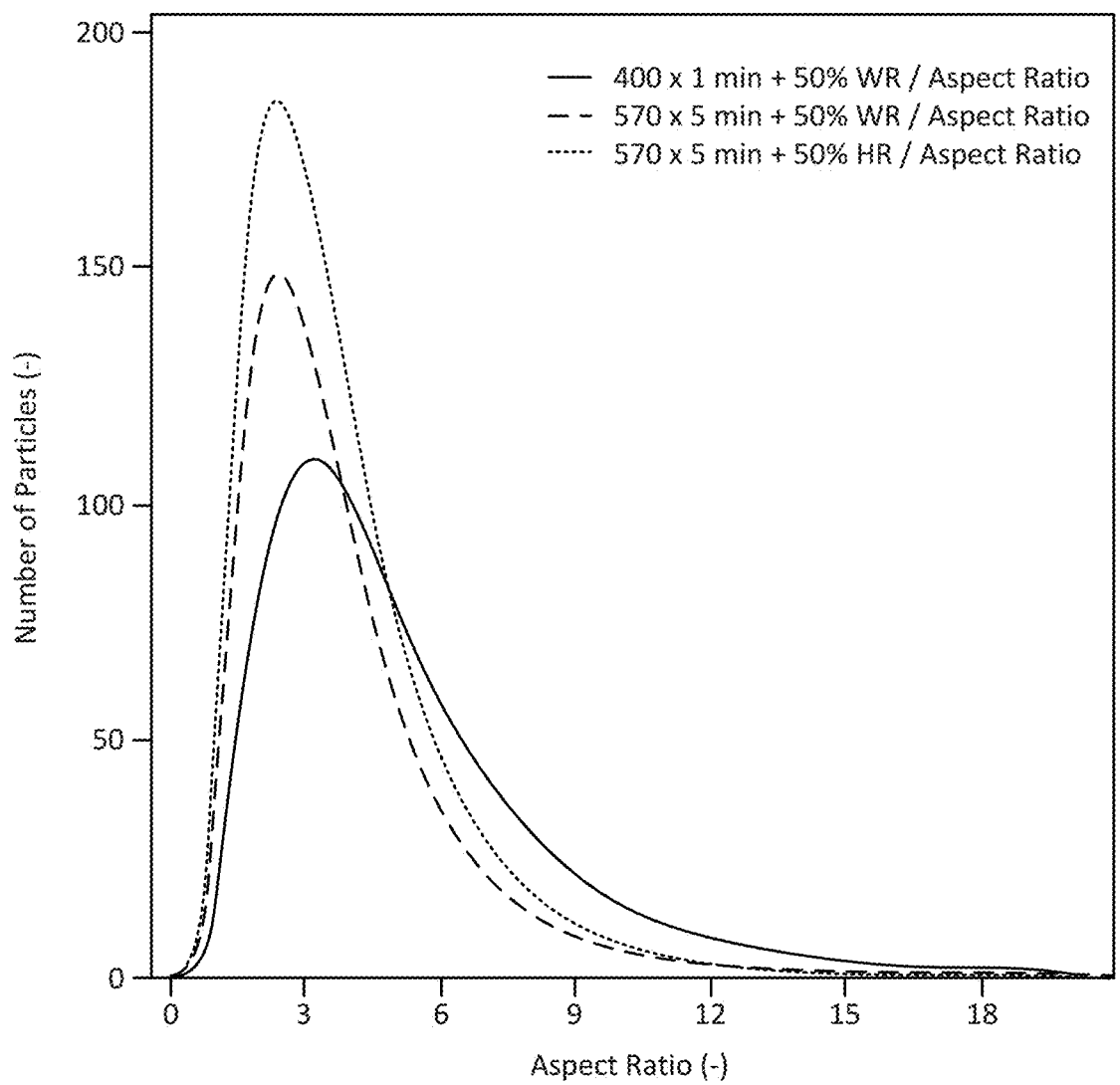
FIG. 2 is a graph showing effects of aluminum alloy processing on iron-containing intermetallic particle shape.

FIG. 2 is a graph showing how the exemplary processing conditions can control iron-containing (Fe-containing) intermetallic particle shape (e.g., an aspect ratio of a width of an Fe-containing intermetallic particle compared to a length of the Fe-containing intermetallic particle) for Alloy 1 (see Table 1). An aspect ratio of 1 (e.g., close to circular) is a preferable Fe-containing intermetallic particle shape for mechanical properties, for example bending, crushing and crash-testing. Evident in the graph, an exemplary processing method including continuous casting, solutionizing at 570° C. treatment for 5 minutes, and hot rolling at 525° C. to a 50% reduction (indicated as 570×5 min+50% HR) provided an aluminum alloy product having Fe-containing intermetallic particles having close to circular shapes, indicating spheroidization of the Fe-containing intermetallic particles. Also evident in the graph, an exemplary processing method including continuous casting, solutionizing at 570° C. treatment for 5 minutes, quenching, and warm rolling at 350° C. to a 50% reduction (indicated as 570×5 min+50% WR) provided an aluminum alloy product having Fe-containing intermetallic particles having close to circular shapes. Warm rolling did not provide as many Fe-containing intermetallic particles having close to circular shapes, indicating that the break-up of the Fe-containing intermetallic particles was less efficient during warm rolling as compared to hot rolling. Further evident in the graph, an exemplary processing method including continuous casting, solutionizing at 400° C. treatment for 1 minute, and warm rolling at 350° C. to a 50% reduction (indicated as 400×1 min+50% WR) provided an aluminum alloy product having elongated (i.e., elliptical and/or needle-like) Fe-containing intermetallic particles, indicating spheroidization of the Fe-containing intermetallic particles was not accomplished. An aluminum alloy product having elongated Fe-containing intermetallic particles can exhibit undesirable mechanical properties.

Figure 3:
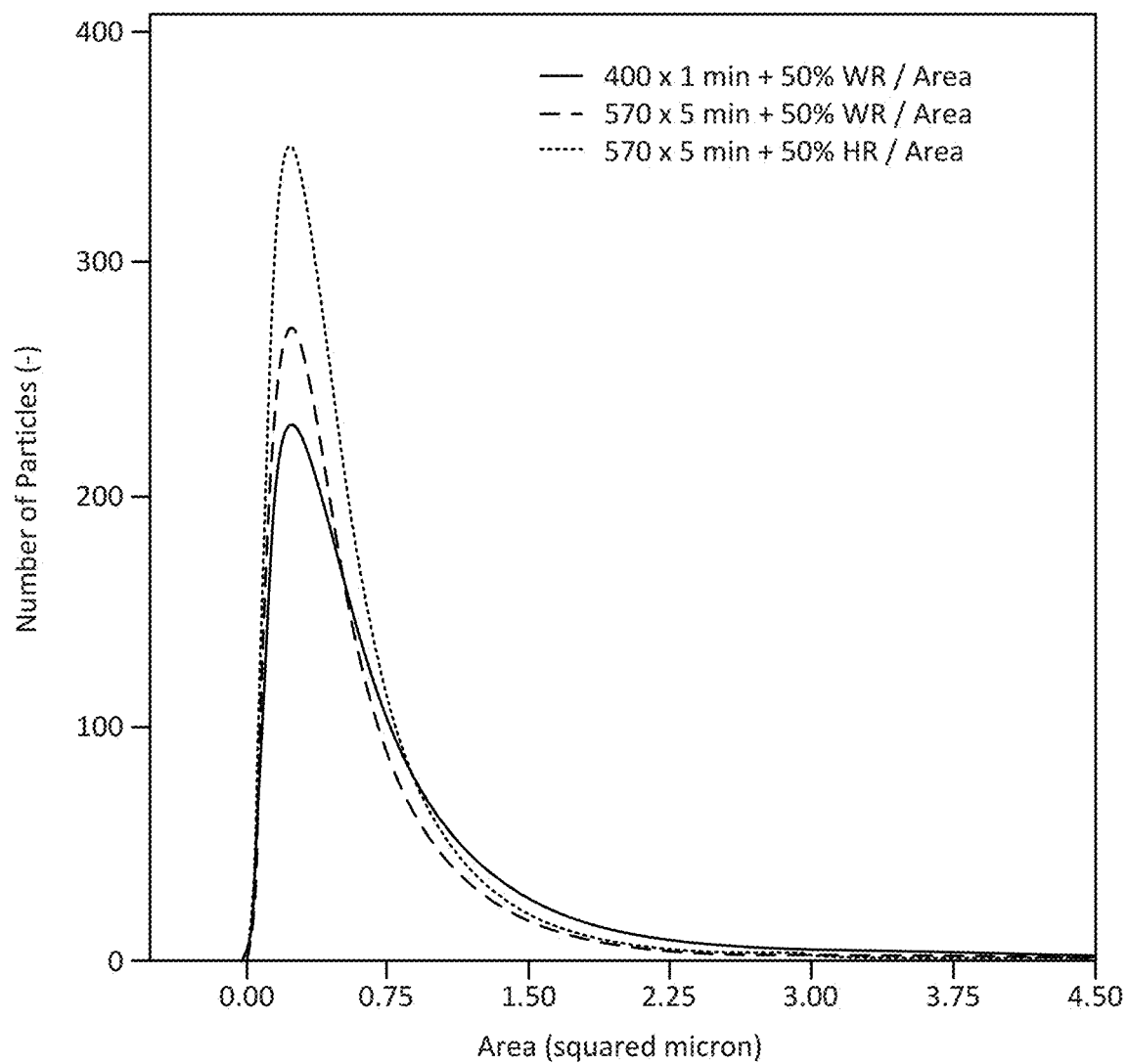
FIG. 3 is a graph showing effects of aluminum alloy processing on iron-containing intermetallic particle size.

FIG. 3 is a graph showing how the exemplary processing conditions can control iron-containing (Fe-containing) intermetallic particle size in Alloy 1. A smaller Fe-containing intermetallic particle size is preferable for attaining desired mechanical properties, for example bending, crushing and crash-testing. Evident in the graph, the exemplary processing method including continuous casting, solutionizing at 570° C. treatment for 5 minutes, and hot rolling at 525° C. to a 50% reduction (indicated as 570×5 min+50% HR) provided an aluminum alloy product having a greater amount of fine Fe-containing intermetallic particles as compared to other exemplary processing methods indicated.

Also evident in the graph, the exemplary processing method including continuous casting, solutionizing at 570° C. treatment for 5 minutes, quenching, and warm rolling at 350° C. to a 50% reduction (indicated as 570×5 min+50% WR) provided an aluminum alloy product having fewer fine Fe-containing intermetallic particles compared to a hot rolled sample. Further evident in the graph, the exemplary processing method including continuous casting, solutionizing at 400° C. treatment for 1 minute, and warm rolling at 350° C. to a 50% reduction (indicated as 400×1 min+50 WR) provided an aluminum alloy product having a greater amount of larger Fe-containing intermetallic particles compared to samples solutionized at higher temperatures. An aluminum alloy product having large Fe-containing intermetallic particles can exhibit undesirable mechanical properties.

Figure 4:
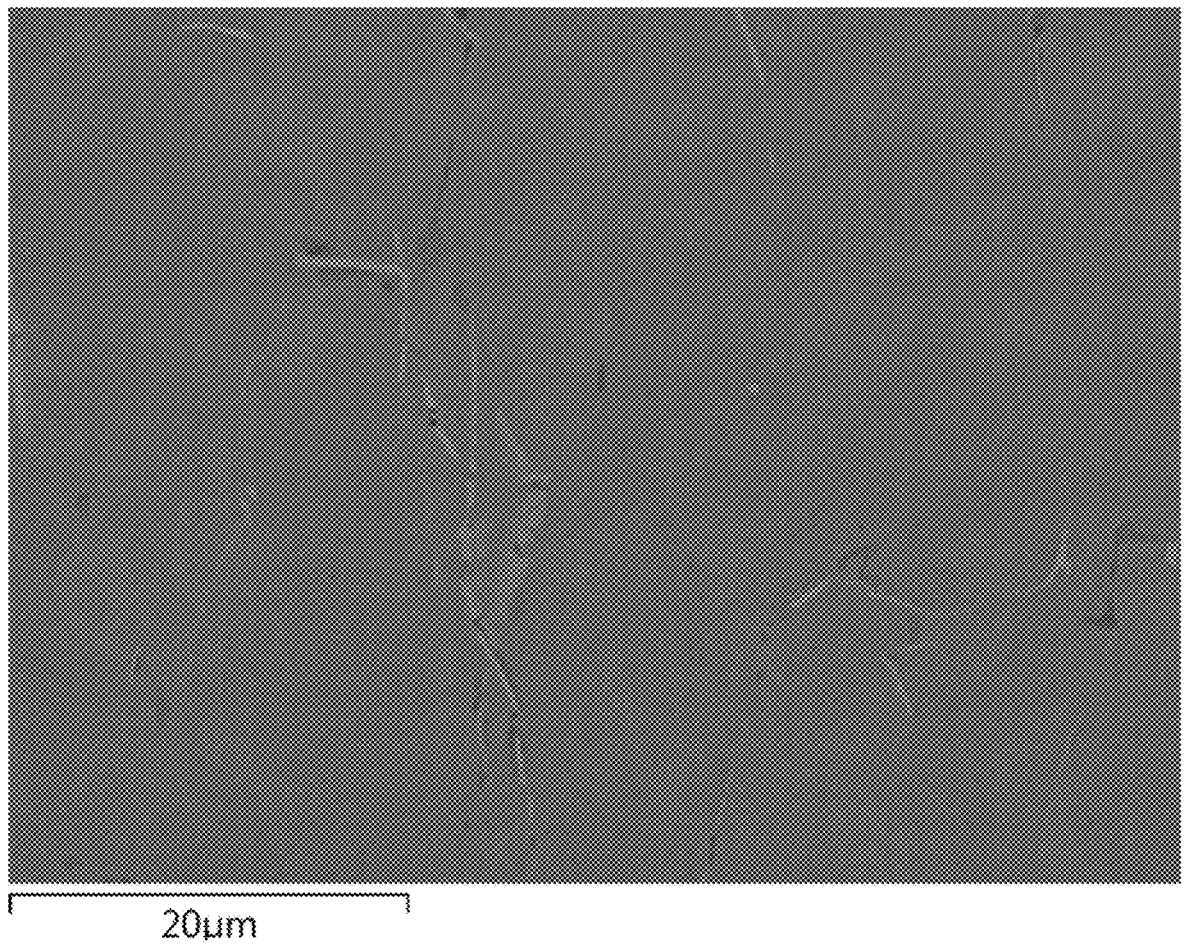
FIG. 4 is a scanning electron microscope micrograph showing iron-containing intermetallic particles in an aluminum alloy processed according to methods described herein.
Figure 5:
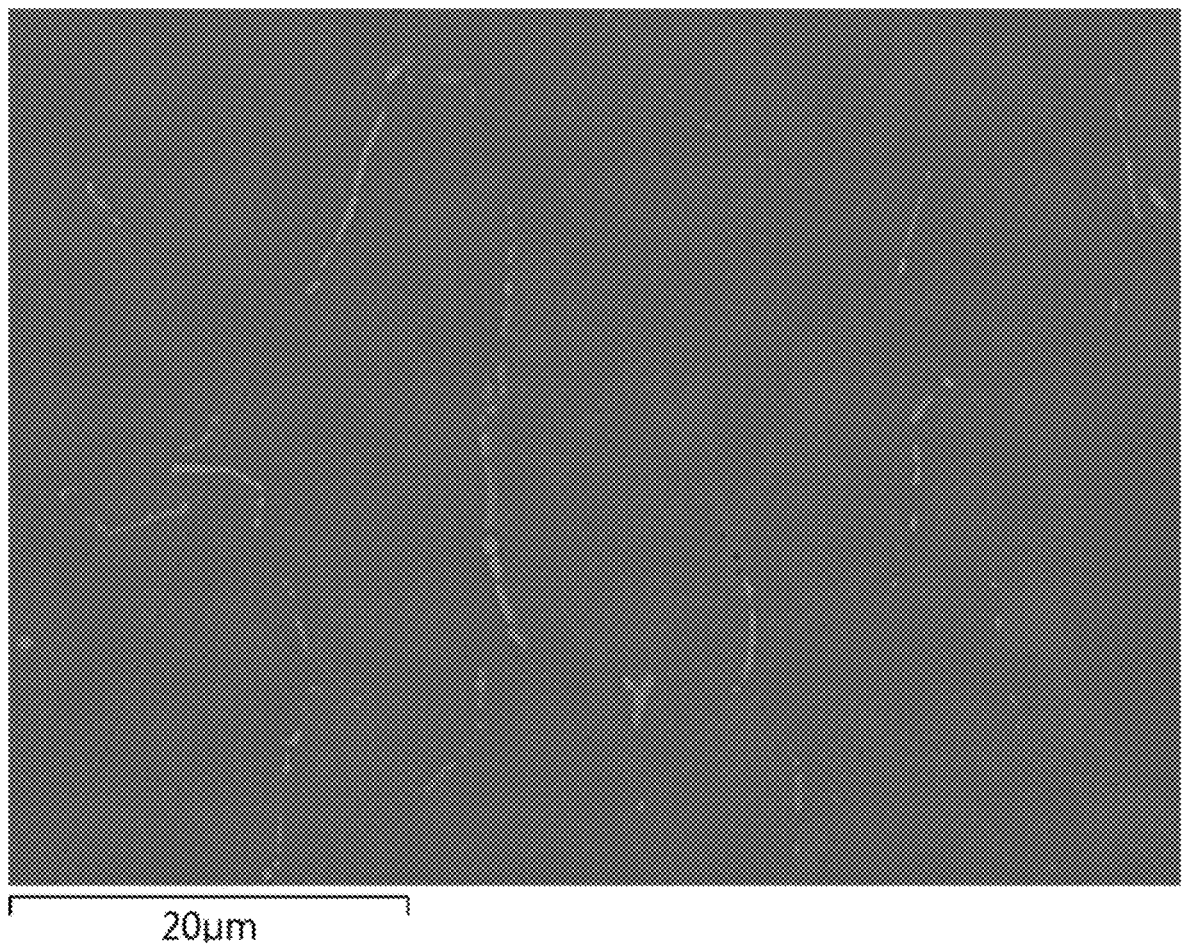
FIG. 5 is a scanning electron microscope micrograph showing iron-containing intermetallic particles in an aluminum alloy processed according to methods described herein.
Figure 6:
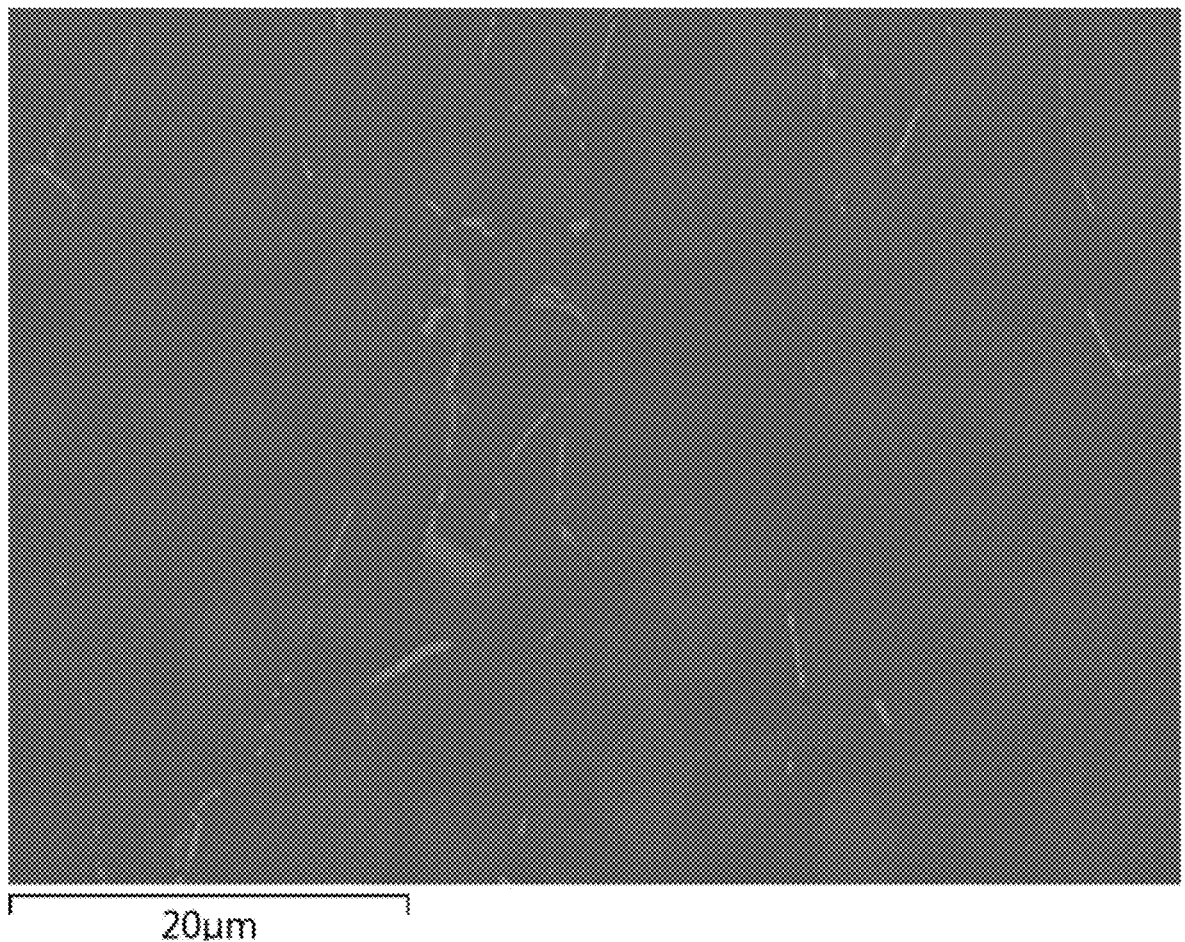
FIG. 6 is a scanning electron microscope micrograph showing iron-containing intermetallic particles in an aluminum alloy processed according to methods described herein.

FIGS. 3, 4, and 5 show scanning electron microscope (SEM) micrographs of Alloy 2 produced according to the exemplary methods described above. FIG. 3 is a SEM back-scattered image of a portion of the AA6451 aluminum alloy subjected to the exemplary processing method including continuous casting, solutionizing at 400° C. treatment for 1 minute, and warm rolling at 350° C. to a 50% reduction. Fe-containing intermetallic particles appear brighter than an aluminum matrix. Evident in the micrograph, the Fe-containing intermetallic particles are elongated and large. FIG. 4 is a SEM back-scattered image of a portion of the AA6451 aluminum alloy subjected to the exemplary processing method including continuous casting, solutionizing at 570° C. treatment for 5 minutes, quenching, and warm rolling at 350° C. to a 50% reduction. Fe-containing intermetallic particles appear brighter than an aluminum matrix. Evident in the micrograph, the Fe-containing intermetallic particles exhibit refinement due to the exemplary processing method. FIG. 5 is a SEM back-scattered image of a portion of the AA6451 aluminum alloy subjected to the exemplary processing method including continuous casting, solutionizing at 570° C. treatment for 5 minutes, quenching, and hot rolling at 525° C. to a 50% reduction. Fe-containing intermetallic particles appear brighter than an aluminum matrix. Evident in the micrograph, the Fe-containing intermetallic particles exhibit refinement and spheroidization due to the exemplary processing method. Refined and spheroidized Fe-containing intermetallic particles provided by the exemplary processing method including continuous casting, solutionizing at 570° C. treatment for 5 minutes, and hot rolling at 525° C. to a 50% reduction can provide an aluminum alloy having desirable mechanical properties.

Figure 7:
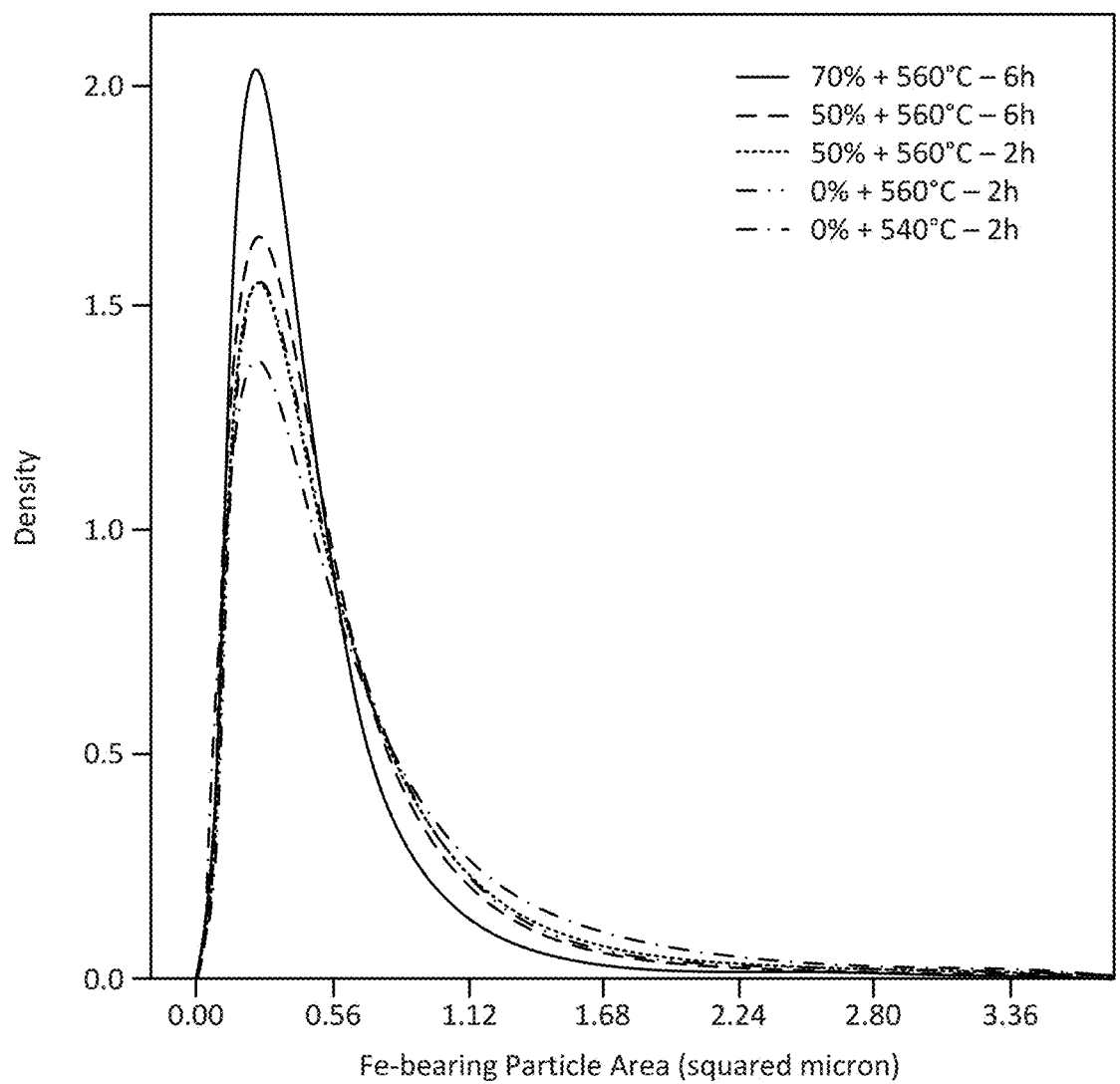
FIG. 7 is a graph showing effects of aluminum alloy processing on iron-containing intermetallic particle size.

FIG. 7 is a graph showing how the exemplary processing conditions can control iron-containing (Fe-containing) intermetallic particle equivalent area ($\mu m^2$) in Alloy 1. Fe-containing intermetallic particle number density (or frequency) was plotted as a function of Fe-containing intermetallic particle equivalent area in lognormal distribution. Evident in the graph is increased Fe-containing intermetallic particle refinement with increased solutionization temperature and increased rolling reduction. For example, an Alloy 1 sample that was subjected to an exemplary method of solutionizing at 540° C. for 2 hours and not hot rolled (i.e., 0% reduction in thickness) (indicated as 0%+540 C—2 h) exhibited a lower density of Fe-containing intermetallic particles having cross-sectional areas less than 1 $\mu m^2$ than an Alloy 1 sample that was subjected to an exemplary method of solutionizing at 560° C. for 2 hours and not hot rolled (i.e., 0% reduction in thickness) (indicated as 0%+560 C—2 h). The Alloy 1 sample that was subjected to the exemplary method of solutionizing at 560° C. for 2 hours and 0% reduction exhibited a lower density of Fe-containing intermetallic particles having cross-sectional areas less than 1 $\mu m^2$ than an Alloy 1 sample that was subjected to an exemplary method of solutionizing at 560° C. for 2 hours and hot rolled to a 50% reduction in thickness (indicated as 50+560 C—2 h). The Alloy 1 sample that was subjected to the exemplary method of solutionizing at 560° C. for 2 hours and hot rolled to a 50% reduction in thickness exhibited a lower density of Fe-containing intermetallic particles having cross-sectional areas less than 1 $\mu m^2$ than an Alloy 1 sample that was subjected to an exemplary method of solutionizing at 560° C. for 6 hours and rolled to a 50% reduction in thickness (indicated as 50%+560 C—6 h). The Alloy 1 sample that was subjected to the exemplary method of solutionizing at 560° C. for 6 hours and hot rolled to a 50% reduction in thickness exhibited a lower density of Fe-containing intermetallic particles having cross-sectional areas less than 1 $\mu m^2$ than an Alloy 1 sample that was subjected to an exemplary method of solutionizing at 560° C. for 6 hours and rolled to a 70% reduction in thickness (indicated as 70%+560 C—6 h). Increasing solutionization time and temperature and subsequently rolling to at least a 70% reduction in thickness can effectively break apart and spheroidize Fe-containing intermetallic particles in continuously cast and hot rolled aluminum alloys, thus allowing high-performance aluminum alloys to contain high amounts of recycled material.

Figure 8:
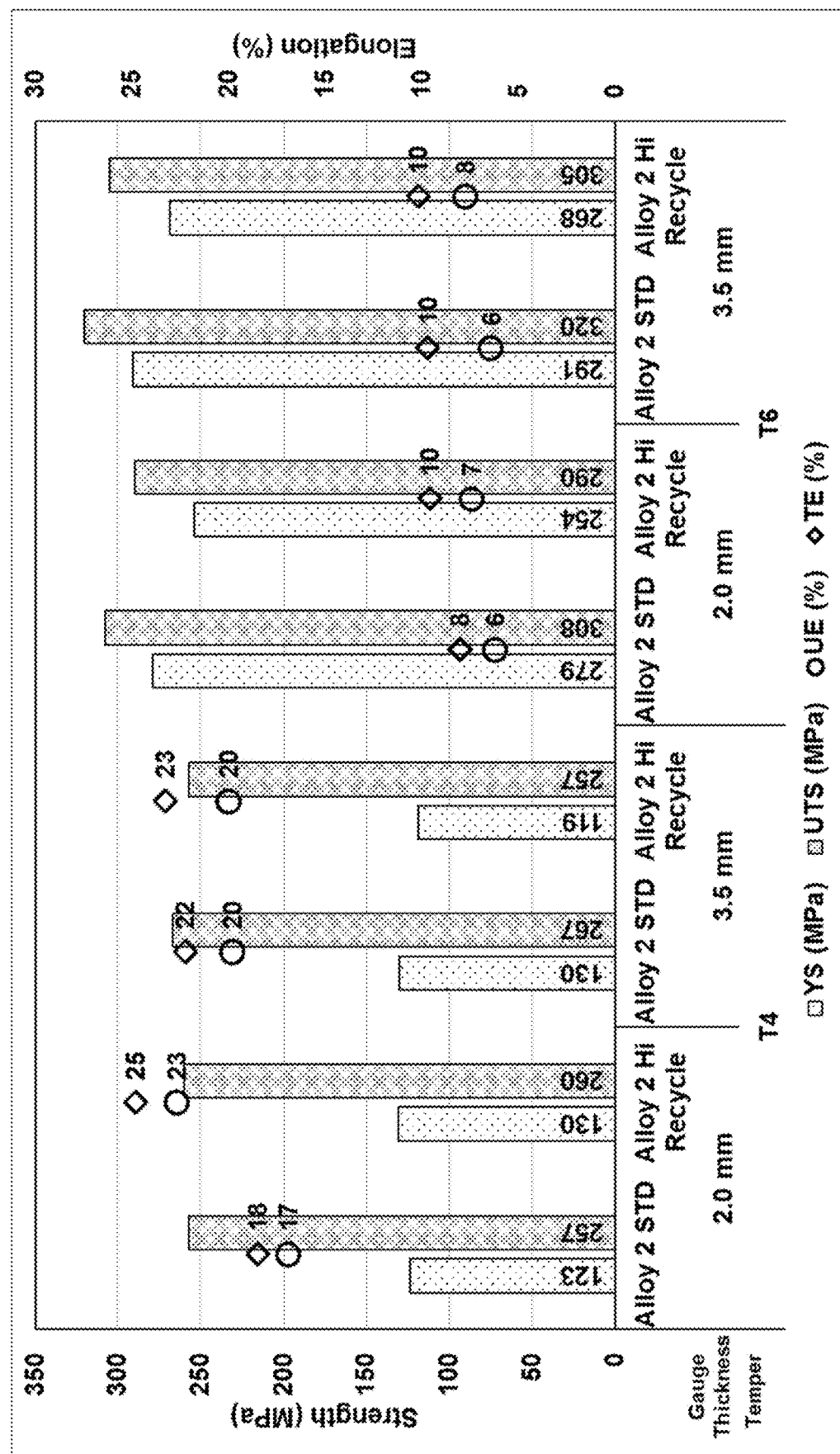
FIG. 8 is a graph showing mechanical properties of an alloy as described herein and prepared from recycled and non-recycled materials.

FIG. 8 is a graph showing mechanical properties of exemplary Alloy 2 described above. Samples of Alloy 2 were continuously cast from non-recycled materials (referred to as "STD") and recycled materials (referred to as "Hi Recycle"). Alloy 2 STD and Alloy 2 Hi Recycle were then solutionized at 570° C. for 1 minute, hot rolled to a 50% reduction in gauge, and water quenched to room temperature. Alloy 2 was then preheated in a preheating furnace at 530° C. for 1 hour, water quenched to 350° C., warm rolled to a final gauge of 3.5 mm or 2.0 mm, solutionized at 490° C. for 0 seconds, and water quenched, providing Alloy 2 STD and Alloy 2 Hi Recycle in a T4 temper (according to Route 1 depicted in FIG. 1A). Samples from Alloy 2 STD and Alloy 2 Hi Recycle were further artificially aged to provide Alloy 2 STD and Alloy 2 Hi Recycle in a T6 temper. FIG. 8 shows the yield strengths (YS, left histogram in each pair), the ultimate tensile strengths (UTS, right histogram in each pair), the uniform elongations (UE, open circles), and the total elongations (TE, open diamonds). Alloy 2 samples containing at least 30% recycled material content exhibited similar mechanical properties to Alloy 2 samples cast from non-recycled materials in either temper. Similarly, Alloy 2 samples provided in a 2.0 mm gauge exhibited similar mechanical properties as Alloy 2 samples provided in a 3.5 mm gauge.

Figure 9:
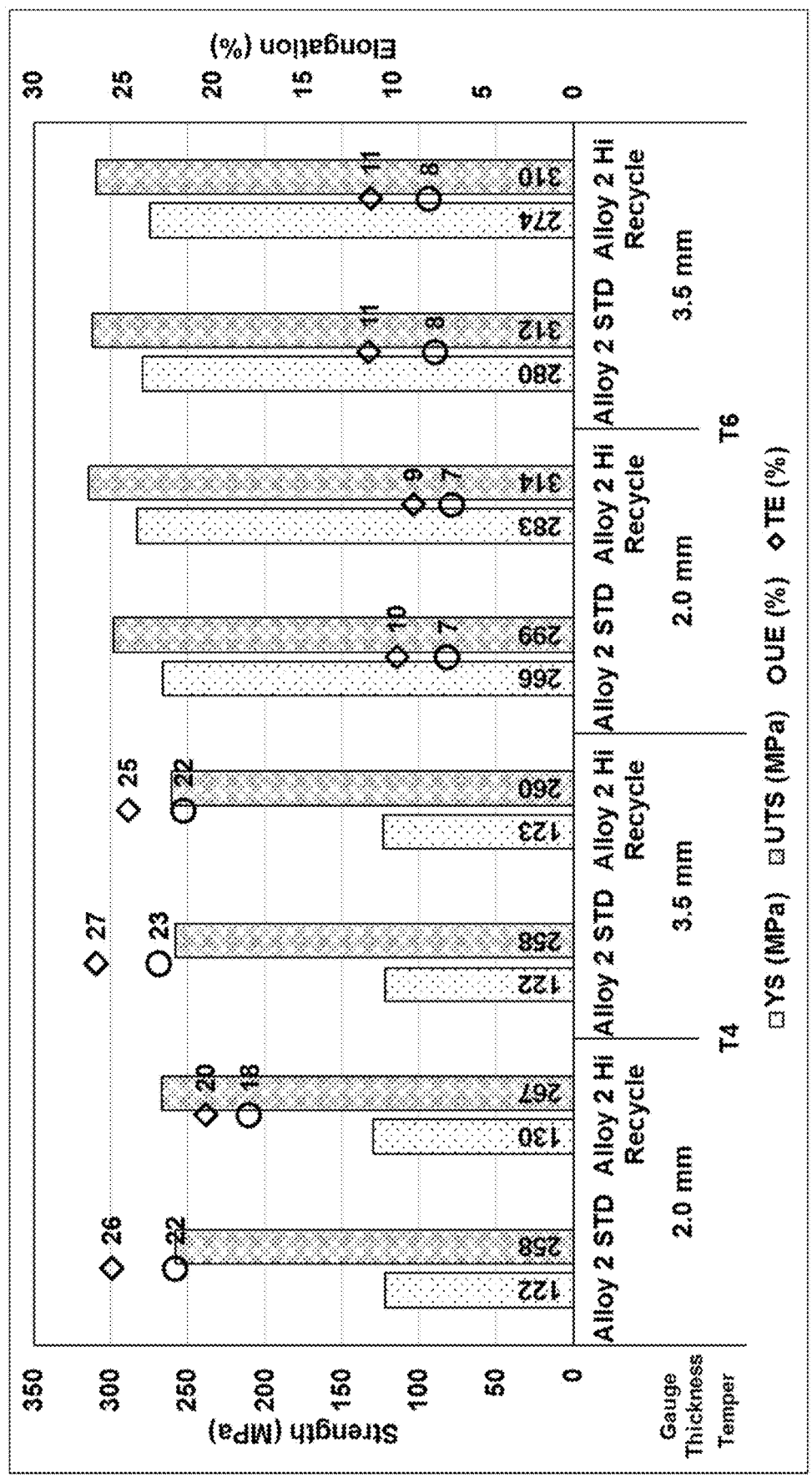
FIG. 9 is a graph showing mechanical properties of an alloy as described herein and prepared from recycled and non-recycled materials.

FIG. 9 is a graph showing mechanical properties of exemplary Alloy 2 described above. Samples of Alloy 2 were cast from non-recycled materials (referred to as "STD") and recycled materials (referred to as "Hi Recycle"). Alloy 2 STD and Alloy 2 Hi Recycle were then solutionized at 570° C. for 1 minute, hot rolled to a 50% reduction in gauge, water quenched, cold rolled to a final gauge of 3.5 mm or 2.0 mm, solutionized at 490° C. for 0 seconds, and water quenched, providing Alloy 2 STD and Alloy 2 Hi Recycle in a T4 temper (according to Route 2 depicted in FIG. 1B). Samples from Alloy 2 STD and Alloy 2 Hi Recycle were further artificially aged to provide Alloy 2 STD and Alloy 2 Hi Recycle in a T6 temper. FIG. 9 shows the yield strengths (YS, left histogram in each pair), the ultimate tensile strengths (UTS, right histogram in each pair), the uniform elongations (UE, open circles), and the total elongations (TE, open diamonds). Alloy 2 samples containing at least 30% recycled material content exhibited similar mechanical properties to Alloy 2 samples cast from non-recycled materials in either temper. Similarly, Alloy 2 samples provided in a 2.0 mm gauge exhibited similar mechanical properties as Alloy 2 samples provided in a 3.5 mm gauge.

Figure 10:
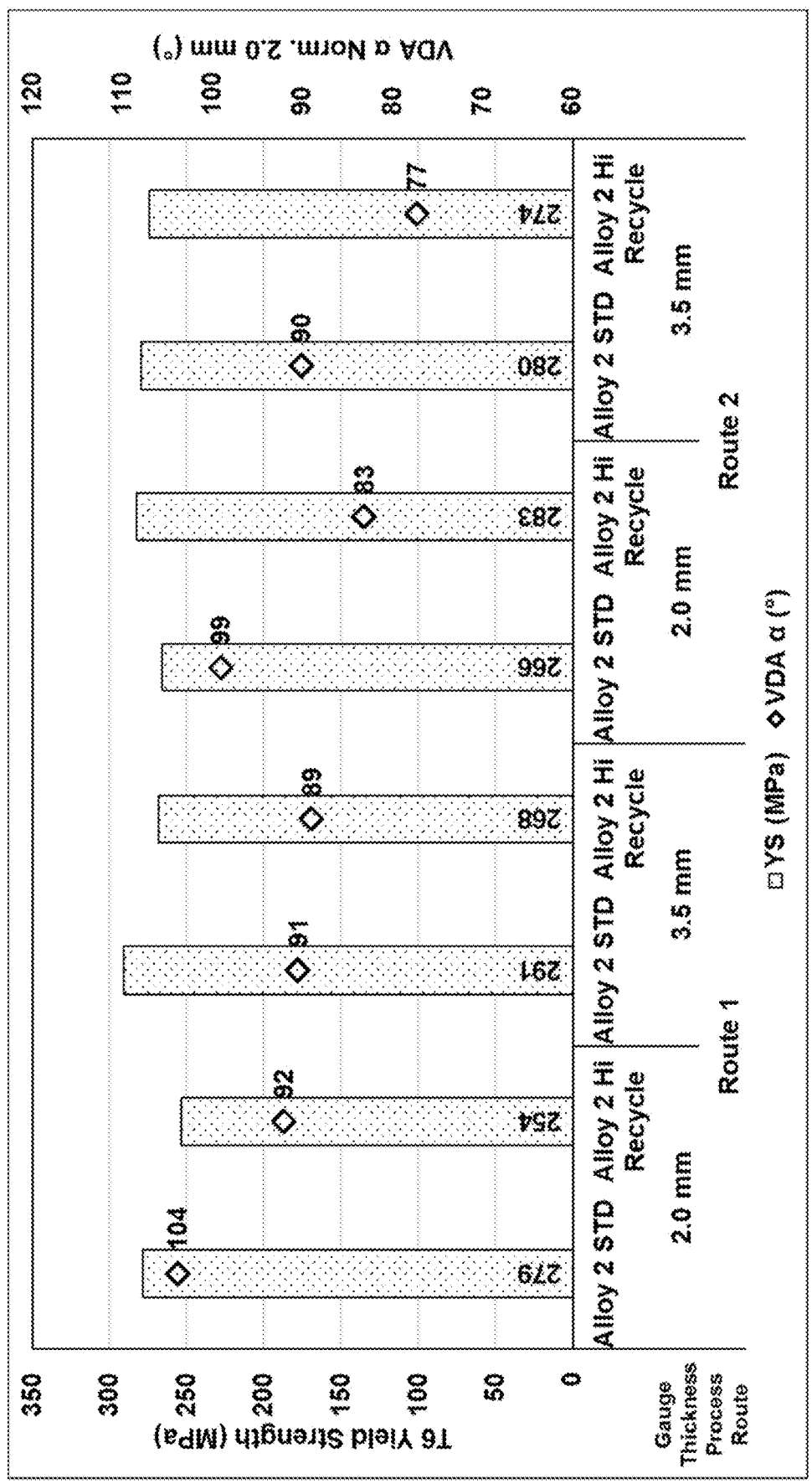
FIG. 10 is a graph showing the yield strength and bend angle of an alloy as described herein and prepared from recycled and non-recycled materials.

FIG. 10 is a graph comparing yield strength and bend angle for Alloy 2. Samples of Alloy 2 were continuously cast from non-recycled materials (referred to as "STD") and recycled materials (referred to as "Hi Recycle"). Alloy 2 STD and Alloy 2 Hi Recycle were then solutionized at 570° C. for 1 minute, hot rolled to a 50% reduction in gauge, and water quenched to room temperature. Alloy 2 was then preheated in a preheating furnace at 530° C. for 1 hour, water quenched to 350° C., warm rolled to a final gauge of 3.5 mm or 2.0 mm, solutionized at 490° C. for 0 seconds, and water quenched, providing Alloy 2 STD and Alloy 2 Hi Recycle in a T4 temper (according to Route 1 depicted in FIG. 1A). Additionally, Alloy 2 STD and Alloy 2 Hi Recycle were continuously cast, solutionized at 570° C. for 1 minute, hot rolled to a 50% reduction in gauge, water quenched, cold rolled to a final gauge of 3.5 mm or 2.0 mm, solutionized at 490° C. for 0 seconds, and water quenched, providing Alloy 2 STD and Alloy 2 Hi Recycle in a T4 temper (according to Route 2 depicted in FIG. 1B). Alloy 2 samples from both routes were further artificially aged to provide Alloy 2 STD and Alloy 2 Hi Recycle in a T6 temper. FIG. 10 shows the yield strengths (YS, histograms) and bend angles (VDA Alpha, open diamonds). Alloy 2 samples cast from at least 30% recycled material exhibited a lower bend angle than Alloy 2 samples cast from non-recycled materials. Additionally, Alloy 2 samples subjected to processing Route 2 exhibited lower bend angles than Alloy 2 samples subjected to processing Route 1. All bend angle tests were performed according to VDA standard 230-100 (2010), without subjecting the samples to pre-straining before bending. All exhibited bend angles were deemed acceptable for use in aluminum alloy products.

Example 3: Direct Chill Cast Aluminum Alloys

A direct chill cast sample was produced from Alloy 2 according to a direct chill casting method as described above, including direct chill casting, homogenization, and hot rolling to provide an aluminum alloy hot band (i.e., an Alloy 2 hot band). The Alloy 2 hot band was further subjected to quenching, cold rolling, solutionizing and artificial aging to provide an Alloy 2 product sample in a T6 temper. A portion of the Alloy 2 product sample was subjected to the exemplary method described herein including preheating (e.g., heated to about 560° C. for 6 hours) and hot rolled to a desired gauge (e.g., a 70% reduction in thickness from the Alloy 2 hot band thickness) to provide an exemplary Alloy 2 product sample and a portion was not preheated or hot rolled according to the methods described herein to provide a comparative Alloy 2 product sample. Tensile testing revealed no difference in yield strength (e.g., the comparative Alloy 2 product sample exhibited a yield strength of 290 MPa and the exemplary Alloy 2 product sample exhibited a yield strength of 290 MPa). A bend test revealed an increase in formability for the exemplary Alloy 2 product sample, as the comparative Alloy 2 product sample exhibited an internal bend angle of 80° and the exemplary Alloy 2 product sample exhibited an internal bend angle of 70°. The results show that the methods can effectively break apart and spheroidize Fe-containing intermetallic particles, providing a high performance aluminum alloy containing at least about 30% of recycled aluminum alloy material.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A method of producing an aluminum alloy product, comprising:
providing a molten aluminum alloy comprising recycled content in an amount of at least 30%;
casting the molten aluminum alloy to produce a cast aluminum alloy product;
homogenizing the cast aluminum alloy product;
hot rolling the cast aluminum alloy product in a first hot rolling step to produce an aluminum alloy hot band;
quenching the aluminum alloy hot band;
preheating the aluminum alloy hot band; and
hot rolling the aluminum alloy hot band in a second hot rolling step to a gauge that is at least a 50% reduction in thickness as compared to a gauge of the cast aluminum alloy product.

2. The method of claim 1, wherein the recycled content in the molten aluminum alloy is at least 50%.

3. The method of claim 1, wherein the recycled content in the molten aluminum alloy is at least 70%.

4. The method of claim 1, wherein the casting comprises continuous casting.

5. The method of claim 4, wherein the casting comprises direct chill casting.

6. The method of claim 1, wherein the providing comprises melting an aluminum alloy, aluminum scrap, or a combination of these.

7. The method of claim 1, wherein the molten aluminum alloy comprises iron.

8. The method of claim 7, wherein the iron is present in an amount of at least 0.25 wt. % based on the weight of the molten aluminum alloy.

9. The method of claim 8, wherein the iron is present in an amount from 0.25 wt. % to 0.50 wt. % based on the weight of the molten aluminum alloy.

10. The method of claim 1, wherein the molten aluminum alloy comprises a 2xxx series aluminum alloy, a 5xxx series aluminum alloy, a 6xxx series aluminum alloy, or a 7xxx series aluminum alloy.

11. The method of claim 1, further comprising quenching the cast aluminum alloy product after the casting.

12. The method of claim 11, wherein the quenching is performed at a rate of 20° C./s to 400° C./s.

13. The method of claim 1, wherein the cast aluminum alloy product is hot rolled in the first hot rolling step to produce an aluminum alloy hot band having a gauge that is a reduction in thickness of 30% to 80% as compared to a gauge of the cast aluminum alloy product.

* * * * *